April 28, 1959 G. X. R. BOUSSU ET AL 2,884,040
PNEUMATIC TIRES
Filed Feb. 12, 1957
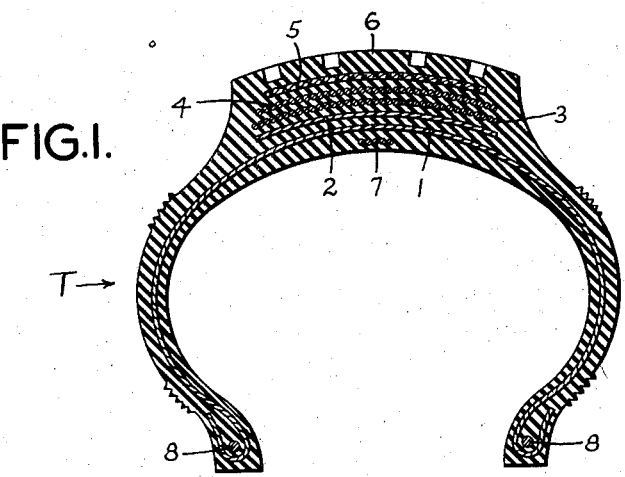
FIG.I.
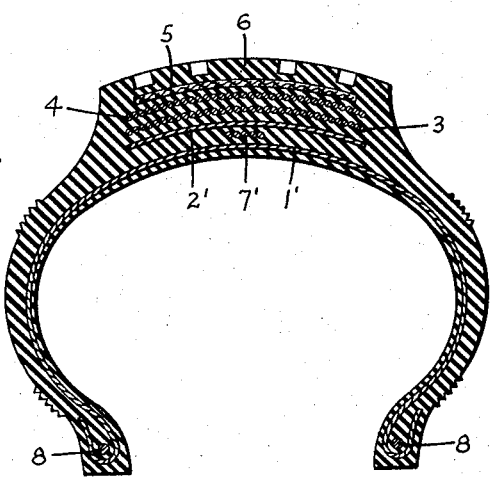
FIG.2.
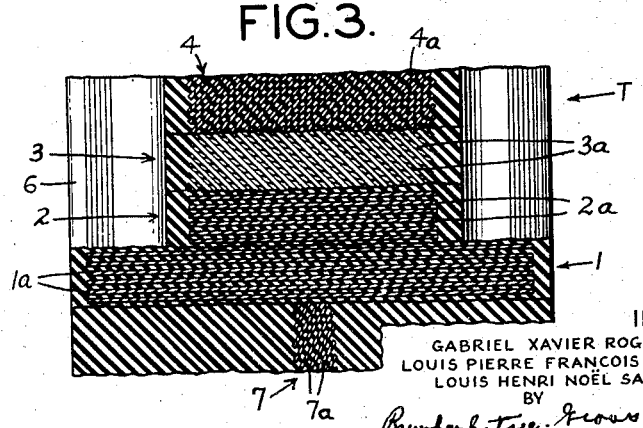
FIG.3.
INVENTORS
GABRIEL XAVIER ROGER BOUSSU
LOUIS PIERRE FRANCOIS ANDRÉ NEUVILLE
LOUIS HENRI NOËL SAINT-FRISON
BY
THEIR ATTORNEYS

United States Patent Office 2,884,040
Patented Apr. 28, 1959

2,884,040

PNEUMATIC TIRES

Gabriel Xavier Roger Boussu, Chamalieres, and Louis Pierre Francois Andre Neuville and Louis Henri Noël Saint-Frison, Clermont-Ferrand, France, assignors to Compagnie Generale des Etablissements Michelin, Clermont-Ferrand, France Application February 12, 1957, Serial No. 639,676

Claims priority, application France February 16, 1956

17 Claims. (Cl. 152—356)

This invention relates to improvements in tires for vehicles and it relates particularly to improvements in pneumatic tires or pneumatic tire casings for automobiles, trucks, railcars and the like.

Relatively few practical types of tire casings have utilized metallic cables or non-metallic cables having equivalent properties, for reinforcing the casings. The most successful of these casings is disclosed in the Bourdon U.S. Patent No. 2,493,614. This tire casing, as disclosed, includes at least one carcass ply containing a plurality of parallel reinforcing elements such as metallic or non-metallic cables and a plurality of reinforced plies disposed at the crown or head of the casing in the zone preferably between the carcass ply and the tread surface of the tire. Each of the plies at the crown or head of the tire casing includes parallel metallic cables, the cables in each ply being disposed at an angle to the cables in other plies to form a triangulated relation which prevents deformation of the tread during the operation of the tire casing on a vehicle, for example, under the influence of transversal stresses when cornering, thereby imparting improved roadholding properties and increased wear to the casing.

The casings are given the most comfortable riding qualities by combining a triangulated crown portion with a carcass ply the reinforcing cables of which extend around the casing from bead to bead substantially in the meridian planes of the tire, i.e., in planes radially of the axis of rotation of the casing.

In a tire casing including one meridianally disposed carcass ply and three head or crown plies, it will be apparent that a number of different arrangements of the plies is possible. The best arrangement from the standpoint of riding comfort and stability comprises a carcass ply and an inner crown ply adjacent to each other and disposed so that the cables of these plies extend substantially meridianally. Two other crown plies are located outwardly of the inner crown ply and have their cables disposed on a bias to the equator of the casing with the cables of one of these plies inclined with respect to the cables of the other.

Arranging the inner crown ply adjacent to and with its reinforcing cables substantially parallel with the cables of the carcass ply renders the tread zone of the casing more flexible and thereby greatly improves the riding properties of the tire, without reducing its resistance to deflection or distortion under transversal stresses as well as under other stress such as longitudinal stresses. But tires containing this arrangement of carcass and crown plies have one disadvantage. After prolonged use under rough road conditions, cracks or splits develop in the interior of the casing generally parallel with the cables of the carcass ply.

Study of the casings having internal splits therein showed that the splits are formed because the meridianally disposed cables separate in a direction circumferentially of the casing when the casing repeatedly strikes rocks or other sharp objects and stretch the rubber between the cables to such an extent that the rubber splits.

The present invention relates to a tire casing of the type described above which is not susceptible to splitting and at the same time has excellent riding qualities and exceptionally good road-holding properties, stability and resistance to impact and wear.

More particularly in accordance with the present invention, we have discovered that transverse internal splitting of the tire casing can be overcome completely by providing a small circumferentially extending flexible hoop or band of substantially inextensible material adjacent to the carcass ply of the tire casing to prevent spreading or separation of the meridianally disposed cables of the carcass ply under impact and sharp bending or deflection of the casing. The hoop or band may be disposed between the carcass ply and a crown ply or inwardly of the carcass ply.

For a better understanding of the present invention, reference may be had to the accompanying drawing in which:

Figure 1 is a cross-sectional view through one side of a tire casing of the type embodying the present invention;

Figure 2 is a cross-sectional view through a modified form of tire embodying the present invention; and Figure 3 is a schematic illustration of the relation of the plies of the tire in accordance with the present invention.

As illustrated in Figure 1 of the drawing, a typical tire casing T includes a carcass or carcass ply 1, triangularly related crown or head plies 2, 3 and 4, to be described in greater detail hereinafter, and eventually a protective or breaker ply 5 which is disposed in the tread band 6 of the tire, all of the plies being embedded in and bonded to rubber to form a tire casing. Also, in accordance with the present invention, a hoop ply 7 is included in the casing adjacent to the carcass ply 1.

As shown in Figure 1, the carcass ply 1 may extend from one bead portion of the tire casing to the other and may be wrapped around the bead cables 8, 8 in the tire. It will be understood that the carcass ply 1 can be interpreted as disclosed in the Bourdon U.S. application, Serial No. 558,785 filed January 12, 1956, now abandoned. As shown in Figure 3, the carcass ply 1 contains reinforcing elements, such as metallic or non-metallic cables 1a arranged in closely spaced parallel relation extending substantially meridianally around the casing.

The crown or head ply 2 contains parallel reinforcing elements, such as, metallic cables 2a also disposed generally meridianally of the tire casing and substantially parallel with the cables 1a of the carcass ply 1 of the tire casing. The cables 1a and 2a of the plies 1 or 2 are considered to be substantially meridianally positioned when they are disposed at an angle between about 65° and 90° to the equatorial plane of the tire.

Reinforcing elements, such as, the parallel metallic cables 3a and 4a of the plies 3 and 4, are laid on a bias to the casing and are inclined with respect to each other. The cables may be inclined from 6 to 40° with reference to the equatorial plane of the casing. Preferably, the cables 3a of the ply 3 are arranged at an angle of about 22° to the equatorial plane of the tire and the cables 4a of the ply 4 are inclined oppositely at an approximately equal angle of 22°, so that the reinforcing elements in plies 2, 3 and 4 form a triangulated structure in the tread zone of the casing.

While the cables 1a in the ply 1 can be metallic or non-metallic, the cables 2a to 4a in the piles 1 to 4 are most suitably metallic cables of the type disclosed in Bourdon Patents Nos. 2,492,352 and 2,598,033. However, the cables 2a to 4a can be made of filaments having properties equivalent to metallic cables. Thus, for example, the cables can be made of fiberglass or other high-tensile strength materials which can be bonded to the rubber.

The reinforcing hoop 7 shown in Figures 1 and 3 is added to the tire casing in accordance with the present invention. The hoop or band 7 must not exceed about one-half the width of the tread zone of the casing, and for best results it must be about one-half to one fifth the width of said tread zone, in order to reinforce the case properly without noticeably stiffening the tread zone.

The hoop or band 7 must be very narrow. If the band is wide, it would act as a spacing member and would completely separate the meridian crown ply from the meridian carcass ply, and the assembly would then form an assembly similar to a stiff and relatively deformable girder or beam, and the riding qualities of the tire would suffer.

The hoop 7 should be relatively inextensible but flexible in order to prevent relative spreading or separation of the cables in the plies 1 and 2, in a circumferential or equatorial direction when the tire casing encounters a rock or other object causing an abrupt indentation of the tread of the tire casing. To that end the hoop ply 7 may comprise a narrow strip of ply fabric containing reinforcing elements such as metallic or non-metallic cables 7a which are disposed generally lengthwise of the strip or at an acute angle of 40° or less to the centerline of the strip.

The cables 7a may be metallic cables such as those shown in the Bourdon U.S. Patents Nos. 2,492,352 and 2,598,033 or they may be cables formed from synthetic fibers such as "nylon" (a long chain linear polyamide) or "dacron" (a polyethylene ester of terephthalic acid) or natural fibers such as cotton or the like. On the other hand, the band 7 can be a strip of relatively inextensible synthetic plastic such as "nylon" or "dacron" or other synthetic material or similar physical properties. The material from which the hoop or band 7 is formed or the cables therein must have a tensile strength of at least 50,000 pounds per square inch to enable the hoop or band to withstand the repeated impact and stresses to which it is subjected and must be capable of bonding securely to rubber. When using a hoop or band 7 of a ply fabric of the type described, the cables 7a therein should extend substantially transversely with respect to the cables 1a of the carcass ply 1, that is, at an angle of about 0° to 40° to the equatorial plane of the tire in order to limit relative spreading of the carcass ply cables 1a to a minimum.

When the reinforcing assembly in the crown portion of the tire is embedded in rubber during the manufacture of the casing, the rubber must bond the hoop 7 perfectly to the remainder of the plies, and thereby contributes to the hooping action.

Figure 2 shows a modified form of tire casing which is similar to the tire casing shown in Figures 1 and 3 with the exception that a reinforcing hoop or band 7' is disposed between the carcass ply 1' and the innermost of the crown or head plies 2'. The action of the hoop 7' in this tire casing is identical with the action of the hoop 7 in the tire casing disclosed in Figure 1.

It will be understood that the tire casings embodying the present invention are susceptible to modification and that the ply or plies 5 can be omitted or additional plies 5 included within the tread and/or sidewall portions of the casing. Accordingly, the tire chosen for purposes of description herein should be considered as illustrative and not limiting the scope of the following claims.

We claim:

1. A pneumatic tire casing having sidewalls, beads at the edges of said sidewalls and a tread portion, a carcass ply in said casing, a plurality of crown plies in said casing substantially coextensive with said tread portion and disposed outwardly of said carcass ply, each of said plies containing a plurality of substantially parallel reinforcing cables, the carcass ply and a crown ply nearest thereto having their cables extending substantially meridianally of said casing, each of the other crown plies having its cables inclined at an angle to the cables of said carcass ply, and a narrow flexible and substantially inextensible band in said casing adjacent to said carcass ply and extending substantially parallel with the equator of said tire, and having a width not exceeding about one-half the width of the tread.

2. The tire casing set forth in claim 1 in which said band is between one-half and one-fifth the width of the tread of said casing.

3. The tire casing set forth in claim 1 in which said band is formed of ply fabric having substantially parallel reinforcing elements therein disposed substantially transversely of the cables in said carcass ply.

4. The tire casing set forth in claim 1 which said band is interposed between said carcass ply and said nearest crown ply.

5. The tire casing set forth in claim 1 in which said band is disposed in said casing inwardly of said carcass ply.

6. A pneumatic tire casing having sidewalls, beads at the edges of said sidewalls and a tread portion, a carcass ply in said casing, at least three crown plies disposed outwardly of said carcass ply and substantially coextensive with said tread portion, said carcass ply and the crown ply nearest to said carass ply having reinforcing cables therein in substantially parallel relation and extending meridianally of said casing, the other crown plies each having substantially parallel reinforcing cables therein disposed on a bias and at different angles with respect to the equator of said tire, and a narrow relatively inextensible, flexible band in said casing adjacent to said carcass ply and extending circumferentially of the casing substantially parallel with the equator of said casing, and having a width not exceeding about one-half the width of the thread.

7. The tire casing set forth in claim 6 in which said band is between about one-half and one-fifth the width of said tread portion.

8. The tire casing set forth in claim 6 in which said band is formed of ply fabric having substantially parallel reinforcing elements therein disposed substantially transversely of the cables in said carcass ply.

9. The tire casing set forth in claim 6 in which said band is a strip of relatively inextensible synthetic plastic having a tensile strength of at least about 50,000 pounds per square inch.

10. The tire casing set forth in claim 6 in which said band comprises a plurality of substantially parallel reinforcing cables extending at an angle of between about 0° and 40° to the equatorial plane of said casing.

11. A pneumatic tire casing having sidewalls, beads at the edges of said sidewalls and a tread portion, a carcass ply in said casing, a plurality of crown plies in said casing substantially coextensive with said tread portion, each of said plies containing a plurality of substantially parallel reinforcing cables, the carcass ply and a crown ply nearest thereto having their cables extending substantially meridianally of said casing, each of the other crown plies having its cables inclined at a different angle to the cables of said carcass ply, and a narrow flexible and substantially inextensible band in said casing adjacent to said carcass ply and extending substantially parallel with the equator of said tire, and having a width not exceeding about one-half the width of the tread.

12. A pneumatic tire casing having sidewalls, beads at the edges of said sidewalls and a tread portion, a carcass ply in said casing, at least three crown plies substantially coextensive with said tread portion, said carcass ply and the crown ply nearest to said carcass ply having reinforcing cables therein in substantially parallel relation and extending meridianally of said casing, the other crown plies each having substantially parallel reinforcing cables therein disposed on a bias and at different angles with respect to the equator of said tire, and a narrow relatively inextensible, flexible band in said casing adjacent to said carcass ply and extending circumferentially of the casing substantially parallel with the equator of said casing, and having a width not exceeding about one-half the width of the tread.

13. A pneumatic tire casing having sidewalls, beads at the edges of said sidewalls and a tread portion, a carcass ply in said casing, a plurality of crown plies in said casing substantially coextensive with said tread portion, each of said plies containing a plurality of substantially parallel reinforcing metallic cables, the carcass ply and a crown ply nearest thereto having the cables extending substantially meridianally of said casing, each of the other crown plies having its cables inclined at a different angle to the cables of the carcass ply, and a narrow flexible and substantially inextensible band in said casing located between said carcass ply and said nearest crown ply and extending substantially parallel with the equator of said tire, and having a width not exceeding about one-half the width of the tread.

14. The tire casing set forth in claim 13 in which said band is between one-half and one-fifth the width of the tread of said casing.

15. The tire casing set forth in claim 13, in which said band is formed of ply fabric having substantially parallel reinforcing metallic cables therein disposed substantially transversely of the cables in said carcass ply.

16. A pneumatic tire casing having sidewalls, beads at the edges of said sidewalls and a tread portion, a carcass ply in said casing, a plurality of crown plies in said casing substantially coextensive with the said tread portion and disposed outwardly of said carcass ply, each of said plies containing a plurality of substantially parallel reinforcing metallic cables, the carcass ply and a crown ply nearest thereto having the cables extending substantially meridianally of said casing, each of the other crown plies having its cables inclined at a different angle to the cables of the carcass ply, and a flexible and substantially inextensible band in said casing, located between said carcass ply and said nearest crown ply, having a width of between one-half and one-fifth the width of the tread of said casing, and formed of ply fabric having substantially parallel reinforcing metallic cables extending at an angle of between about 0° and 40° to the equatorial plane of said casing.

17. A pneumatic tire casing having sidewalls, beads at the edges of said sidewalls and a tread portion, a carcass ply in said casing, at least three crown plies disposed outwardly of said carcass ply and substantially coextensive with said tread portion, said carcass ply and the crown ply nearest to said carcass ply having reinforcing cables therein in substantially parallel relation and extending meridianally of said casing, the other crown plies each having substantially parallel reinforcing metallic cables therein disposed on a bias and at different angles with respect to the equator of said tire, and a relatively inextensible, flexible band in said casing located between said carcass ply and said nearest crown ply, having a width of between one-half and one-fifth the width of the tread of said casing, and formed of ply fabric having substantially parallel reinforcing metallic cables extending at an angle of between about 0° and 40° to the equatorial plane of said casing.

References Cited in the file of this patent

UNITED STATES PATENTS 2,493,614    Bourdon _____ Jan. 3, 1950

FOREIGN PATENTS 700,435    Great Britain _____ Dec. 2, 1953

UNITED STATES PATENT OFFICE
CERTIFICATE OF CORRECTION

Patent No. 2,884,040                                                   April 28, 1959

Gabriel Xavier Roger Boussu et al.

It is hereby certified that error appears in the printed specification of the above numbered patent requiring correction and that the said Letters Patent should read as corrected below.

Column 2, line 42, for "interpreted" read -- interrupted --; line 69, for "piles" read -- plies --; column 3, line 10, for "case" read -- casing --; line 67, after "not" insert -- as --; column 4, line 16, before "which" insert -- in --.

Signed and sealed this 1st day of September 1959.

(SEAL)
Attest:

KARL H. AXLINE
Attesting Officer

ROBERT C. WATSON
Commissioner of Patents